US010205849B2

(12) United States Patent
Morovic et al.

(10) Patent No.: US 10,205,849 B2
(45) Date of Patent: Feb. 12, 2019

(54) TO PROCESS INFORMATION TO USE AT LEAST ONE OPAQUE INK AS A PROCESS COLORANT (71) Applicants: HEWLETT-PACKARD DEVELOPMENT COMPANY, L.P., Houston, TX (US); Jan Morovic, Colchester (GB); Peter Morovic, Sant Cugat del Valles (ES); Juan Manuel Garcia Reyero Vinas, Sant Cugat del Valles (ES); Ronald Albert Askeland, San Diego, CA (US); Andreas Muller, Barcelona (ES); Michel Georges Encrenaz, Rubi (ES)

(72) Inventors: Jan Morovic, Colchester (GB); Peter Morovic, Sant Cugat del Valles (ES); Juan Manuel Garcia Reyero Vinas, Sant Cugat del Valles (ES); Ronald Albert Askeland, San Diego, CA (US); Andreas Muller, Barcelona (ES); Michel Georges Encrenaz, Rubi (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/306,974

(22) PCT Filed: Apr. 28, 2014

(86) PCT No.: PCT/EP2014/058627
§ 371 (c)(1),
(2) Date: Oct. 26, 2016

(87) PCT Pub. No.: WO2015/165491
PCT Pub. Date: Nov. 5, 2015

(65) Prior Publication Data
US 2017/0048417 A1   Feb. 16, 2017

(51) Int. Cl.
H04N 1/405 (2006.01)
H04N 1/60 (2006.01)
H04N 1/54 (2006.01)

(52) U.S. Cl.
CPC ............... *H04N 1/405* (2013.01); *H04N 1/54* (2013.01); *H04N 1/6019* (2013.01); *H04N 1/6058* (2013.01)

(58) Field of Classification Search
CPC ........ H04N 1/405; H04N 1/54; H04N 1/6019; H04N 1/6058
(Continued)

(56) References Cited

U.S. PATENT DOCUMENTS 6,081,344 A    6/2000  Bockman et al.
7,717,532 B2 * 5/2010  Kroon ..................... H04N 1/54
                                                            347/15

(Continued)

FOREIGN PATENT DOCUMENTS

CN    102945556        2/2013
WO    WO-2007091278    8/2007
(Continued)

OTHER PUBLICATIONS

Iovine et al; Application of Neugebauer-based Models to Ceramic Printing; IS&T/SID Twelfth Color imaging Conference; Oct 11, 2004.
(Continued)

Primary Examiner — Quang N Vo
(74) Attorney, Agent, or Firm — HP Inc. Patent Department (57) ABSTRACT A processing apparatus is provided. The processing apparatus includes a controller to process information as part of a Halftone Area Neugebauer Separation printing process to
(Continued)

use at least one opaque ink as a process colorant in combination with at least one further process colorant.

13 Claims, 4 Drawing Sheets

(58) Field of Classification Search
USPC .................................. 358/3.06, 518, 3.23
See application file for complete search history.

(56) References Cited

U.S. PATENT DOCUMENTS

| | | | |
|---|---|---|---|
| 7,738,142 B2* | 6/2010 | Edge | .................... H04N 1/6016 |
| | | | 358/1.9 |
| 2008/0111998 A1 | 5/2008 | Edge | |
| 2011/0096365 A1* | 4/2011 | Benedicto | ............ H04N 1/6033 |
| | | | 358/3.06 |
| 2014/0009536 A1 | 1/2014 | Yoshida | |

FOREIGN PATENT DOCUMENTS

| | | |
|---|---|---|
| WO | WO-2012160346 | 11/2012 |
| WO | WO-2014011995 | 1/2014 |

OTHER PUBLICATIONS

Morovic et al.; Controlling Ink-Jet Print Attributes Via Neugebauer Primary Area Coverages; IEEE Transactions on Image Processing, IEEE Service Center.

* cited by examiner

TO PROCESS INFORMATION TO USE AT LEAST ONE OPAQUE INK AS A PROCESS COLORANT

BACKGROUND

Printers combine process colorants to produce a gamut of colors. Spot colors and other inks are also used in printing.

BRIEF DESCRIPTION

Reference will now be made by way of example only to the accompanying drawings in which.

DETAILED DESCRIPTION

Figure 1:
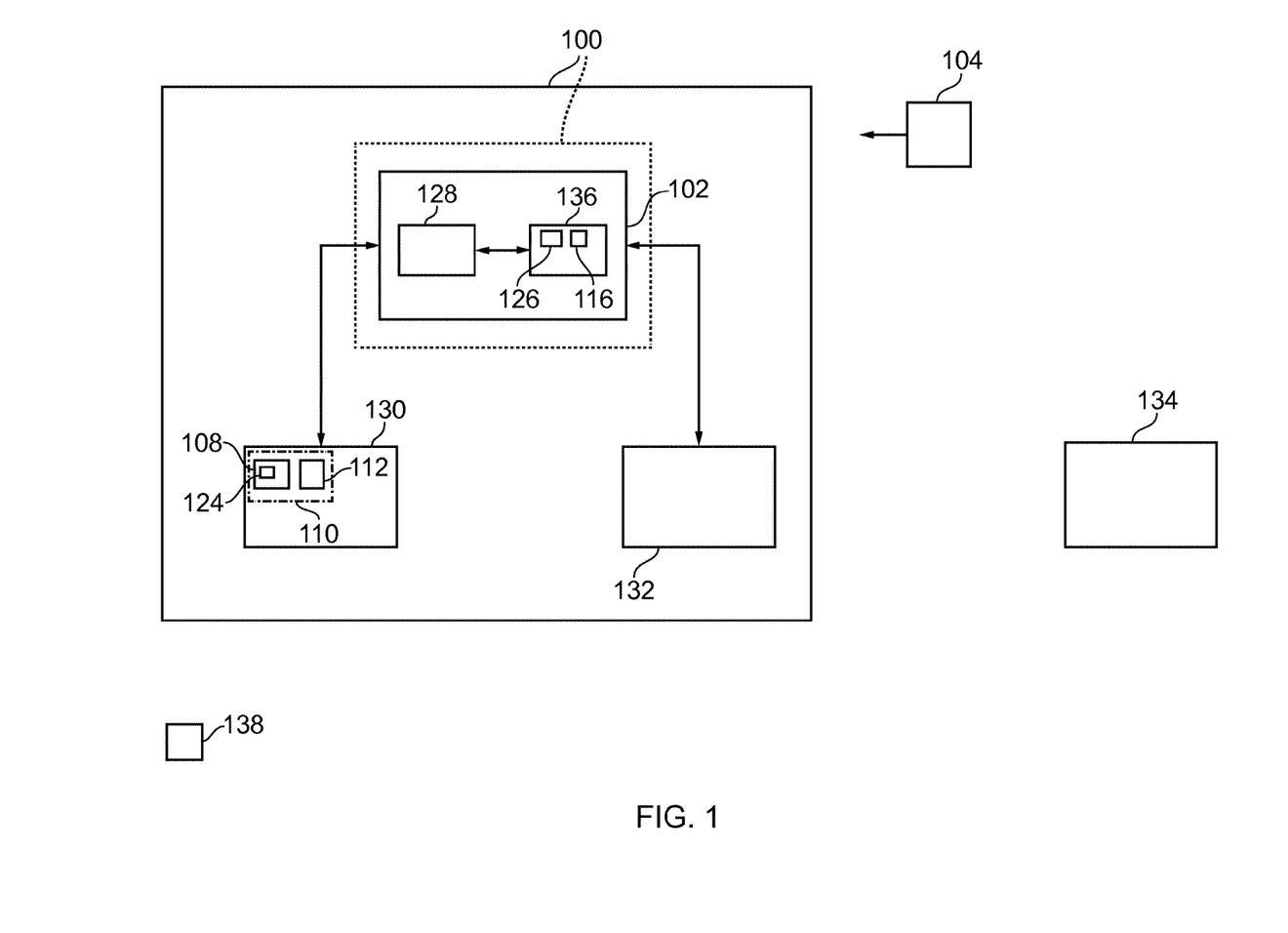
FIG. 1 illustrates an apparatus according to an example.

FIG. 1 illustrates a processing apparatus 100, comprising: a controller 102 to process information 104 (which may be referred to as data in some examples) as part of a printing process, which in some examples may be a Halftone Area Neugebauer Separation printing process, to use at least one opaque ink 108 as a process colorant 110 in combination with at least one further process colorant 112.

FIG. 1 illustrates an example of an apparatus 100. The apparatus 100 may be a processing apparatus 100 and may for example, be incorporated into a printer. The apparatus 100 may comprise a controller 102, a medium manager 132 and a print engine 130.

The controller 102 controls operation of the apparatus 100.

In some examples, the apparatus 100 may be a printing apparatus 100, for example a printer, and may comprise any number of additional elements not illustrated in the example of FIG. 1. For example, the apparatus 100 may comprise any suitable printer such, for example, as a dot matrix printer, an inkjet printer, a laser printer, line printer, a solid ink printer and so on.

In other examples, the apparatus 100 may not comprise the medium manager 132 and print engine 130 as indicated by the dotted line in the example of FIG. 1. That is, in some examples the apparatus 100 may be separate from a printer apparatus that comprises the medium manager 132 and print engine 130.

For example, the apparatus 100 may be comprised in a computing device such as a personal computer, a laptop computer, a desktop computer, a digital camera, a personal digital assistance device, a cellular phone and so on.

The apparatus 100 may be arranged to communicate with the printer apparatus, such as a printer, comprising the medium manager 132 and print engine 130. For example, the apparatus may be arranged to communicate with the printer apparatus by wired or wireless communication.

In such examples, the printer apparatus, which is separate from the apparatus 100, may also comprise a controller 102 as described above and may also be capable of processing information 104. Therefore, in some examples, the apparatus 100 and the separate printer apparatus may both comprise a controller 102 (not illustrated in FIG. 1).

In examples, the processing of information 104 may be performed by the apparatus 100 indicated by the dotted line in FIG. 1 and separate from a printing apparatus.

In other examples, the processing of information 104 may be performed by the apparatus 100 that includes the controller 102, the medium manager 132 and the print engine 130 or by both the apparatus 100 and a separate printing apparatus in combination.

Implementation of controller 102 can be in hardware alone (a circuit, a processor and so on), have certain aspects in software including firmware alone or can be a combination of hardware and software (including firmware).

The controller 102 may be implemented using instructions that enable hardware functionality, for example, by using executable computer program instructions in a general-purpose or special-purpose processor that may be stored on a computer readable storage medium (disk, memory etc) to be executed by such a processor.

The processor 128 is arranged to read from and write to the memory 136. The processor 128 may also comprise an output interface (not illustrated) via which data and/or commands are output by the processor 128 and an input interface (not illustrated) via which data and/or commands are input to the processor 128.

The memory 136 stores a computer program 126 comprising computer program instructions that control the operation of the apparatus 100 when loaded into the processor 128. The computer program instructions provide the logic and routines that enables the apparatus to perform the methods illustrated in FIGS. 2, 3 and 4. The processor 128 by reading the memory 136 is able to load and execute the computer program 126.

The apparatus therefore comprises:

at least one processor; and at least one memory including computer program code the at least one memory and the computer program code configured to, with the at least one processor, cause the apparatus at least to perform:

processing information as part of a printing process, which in some examples may be a Halftone Area Neugebauer Separation printing process, to use at least one opaque ink as a process colorant in combination with at least one further process colorant.

The computer program may arrive at the apparatus 100 via any suitable delivery mechanism 138. The delivery mechanism 138 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 126. The delivery mechanism may be a signal arranged to reliably transfer the computer program 126. The apparatus 100 may propagate or transmit the computer program 126 as a computer data signal.

Although the memory 136 is illustrated as a single component it may be implemented as one or more separate components some or all of which may be integrated/removable and/or may provide permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 2:
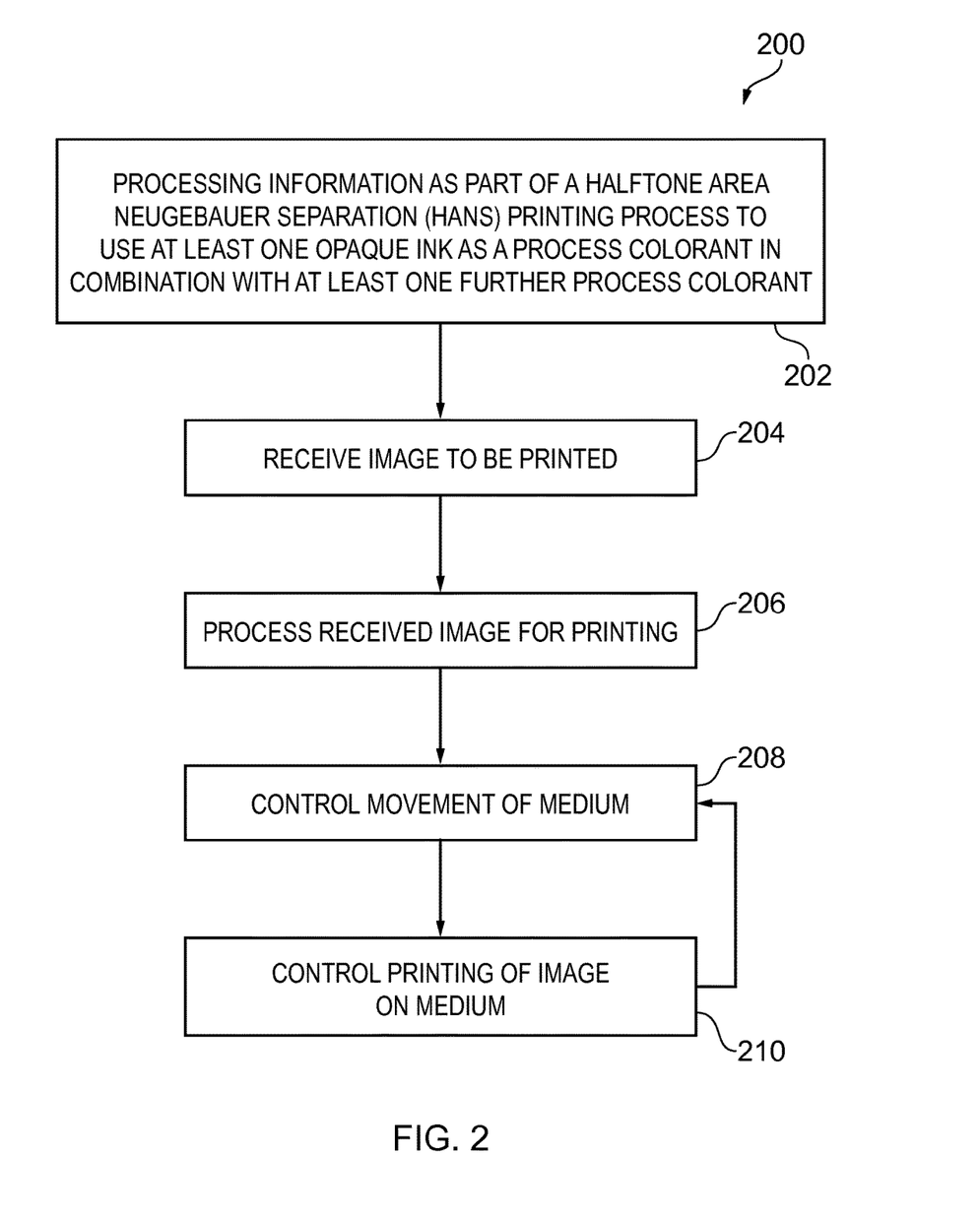
FIG. 2 illustrates a printing method according to an example.
Figure 3:
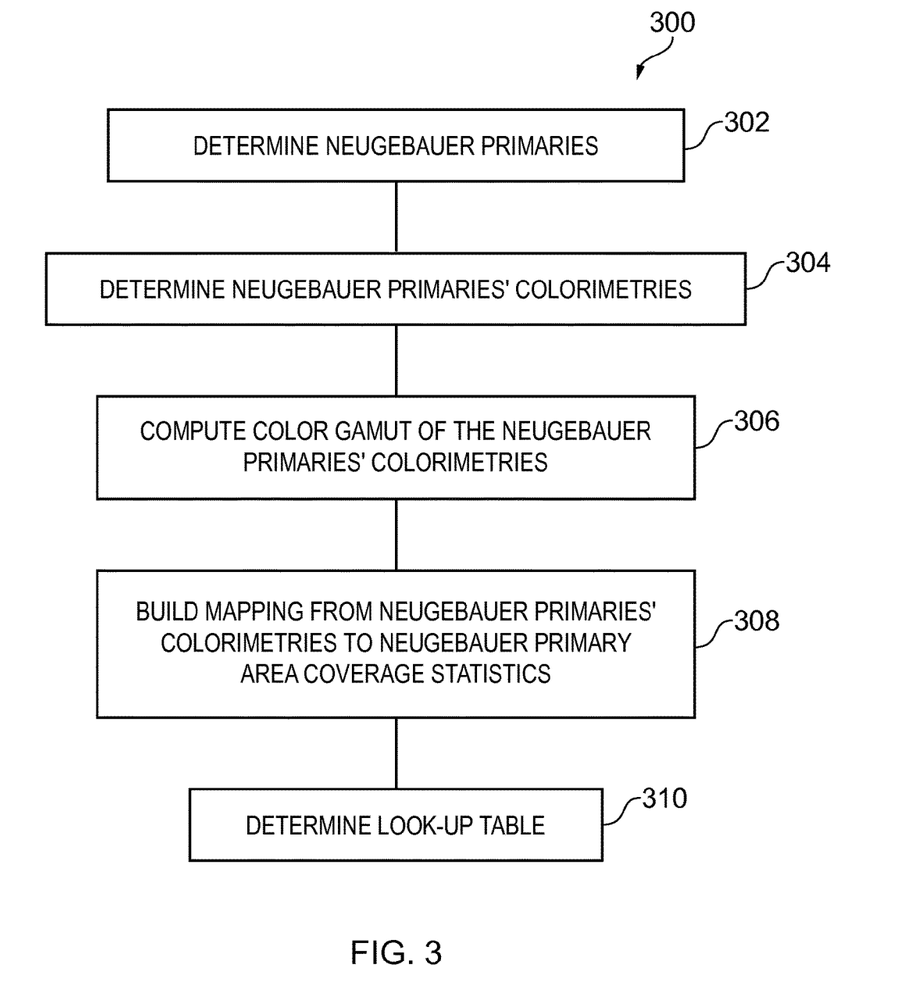
FIG. 3 illustrates a processing method according to an example.
Figure 4:
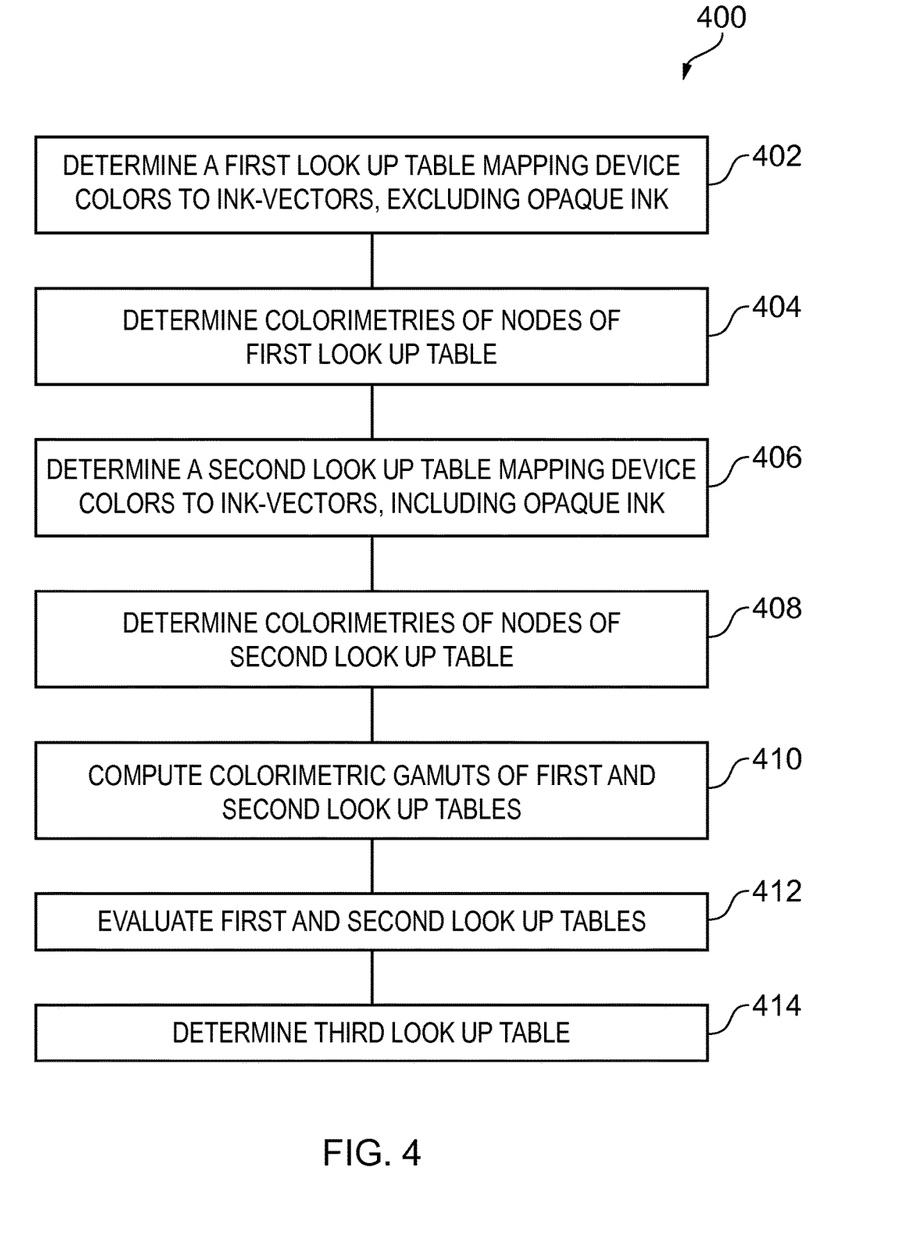
FIG. 4 illustrates a processing method according to an example.

The controller 102 provides means for performing the method of any of FIGS. 2, 3 or 4 alone or in combination. For example the controller provides the means for controlling the apparatus 100 described herein.

The controller 102 may be a controller 102 to process information 104 as part of a Halftone Area Neugebauer Separation (HANS) printing process to use an opaque ink 108 as a process colorant 110 in combination with at least one further process colorant 110.

Conventionally there is a distinction between process colorants, such as cyan (C), yellow (Y), magenta (M) and black (K) inks, and opaque inks such as white ink 124. The process colorants may be freely combined to yield a continuous color gamut usable for a variety of print content, while the opaque ink(s) are explicitly assigned to print job elements and printed as an independent channel.

By using a HANS printing process, it is possible to treat an opaque ink/inks 108, such as white ink 124, as a process colorant.

In some examples, including both HANS and non-HANS examples, the opaque ink/inks 108 is considered opaque as it is more opaque than a process colorant. For example, the opacity of the opaque ink/inks may be higher than the opacity of typical process colorants.

In some examples, including both HANS and non-HANS examples, a range of opacity (Y %) of the opaque ink/inks may be defined:

$$Y\% = 100 \times (Y\_onBlack/Y\_onWhite)$$

Where: Y_onBlack is the colorimetric value/values of the opaque ink/inks measured on black media and Y_onWhite is the colorimetric value/values of the opaque ink/inks measured on white media.

In some examples, including both HANS and non-HANS examples, typical values of opacity (Y %) of the opaque ink/inks may run from 50% to 95%.

In examples, the information 104 that is processed may be stored in the memory 136. The information 104 may be received by the apparatus 100 via any suitable interface (not illustrated for the purpose of clarity). For example, the information 104 may be received by wired or wireless communications or input into the apparatus 100 by any suitable user interface.

The processor 128 and the memory 136 are operationally coupled and any number or combination of intervening elements can exist (including no intervening elements).

The medium manager 132 and print engine 130 are operatively coupled to the controller 102 to allow data such as control signals and other information to be passed between the controller 102 and the medium manager 132 and print engine 130.

Any number or combination of intervening elements can exist (including no intervening elements) between the medium manager 132 and the controller 102, and the print manager 130 and the controller 102.

The medium manager 132 is arranged to control movement and positioning of medium 134 to allow print engine 130 to print on the medium 134.

The medium 134 may be any suitable substrate and may include any variety of paper (lightweight, heavyweight, coated, uncoated, paperboard, cardboard and so on), films, foils, textiles, fabrics or plastics.

The medium manager 132 comprises any suitable means for controlling the movement and/or position of the medium 134. For example, the medium manager 132 may comprise one or more rollers (not illustrated).

The print engine 130 is arranged to deposit ink on medium 134. In the example illustrated in FIG. 1, the print engine 130 comprises a plurality of process colorants and also at least one opaque ink 108 which may be white ink 124. The opaque ink/inks 108 may be treated as a process colorant 110 by using a HANS printing process.

In some examples, the process colorants may comprise cyan (C), magenta (M), yellow (Y) and/or black (K) ink/inks in addition to the opaque ink/inks 108. However, any suitable process colorants may be used. In addition, any number of process colorants may be used. Additionally/Alternatively, any number of opaque inks may be used.

In some examples, the print engine 130 may not comprise the opaque ink/inks 108 and the other process colorant inks. The print engine 130 may be arranged to receive the inks, for example the print engine 130 may be arranged to receive ink cartridges.

Operation of the apparatus 100 illustrated in the example of FIG. 1 is described in the following paragraphs with reference to FIGS. 2 and 3.

FIG. 2 illustrates an example of a printing method 200. In examples, the method 200 may be performed by the apparatus 100 of FIG. 1.

At block 202, information 104 is processed as part of a Halftone Area Neugebauer Separation (HANS) printing process to use at least one opaque ink 108, such as white ink 124, as a process colorant 110 in combination with at least one further process colorant 112.

Block 202 may be described in greater detail in the following paragraphs with reference to FIG. 3.

At block 204 an image to be printed is received. The image may be received by any suitable means. For example, the image may be uploaded to the apparatus 100 or retrieved by the apparatus 100 from the memory 136 or a remote storage location such as an online storage location using the Internet for example. In some examples, it may not be an image that is received, but may be anything for printing onto medium 134, for example text and so on.

At block 206, the image is processed for printing. In examples, the image is processed as per a HANS printing process. For example, this may comprise determining Neugebauer primary area coverages, halftoning (either by error diffusion or via a threshold matrix for example) and so on.

Blocks 208 and 210 operate in combination as movement of the medium 134 and printing of the image on the medium 134, as dictated by a HANS printing process, is controlled.

In examples, the movement of the medium and the printing of the image may be controlled until the image is fully printed as indicated by the arrow looping back from block 210 to block 208.

FIG. 3 illustrates an example of a processing method 300.

In examples, the method 300 may be performed by the controller 102 of apparatus 100 illustrated in the example of FIG. 1.

At block 302, Neugebauer Primaries for a printing system, such as he apparatus 100 illustrated in the example of FIG. 1, are determined in examples, the Neugebauer Primaries include at least one opaque ink 108, for example white ink 124, in combination with at least one further process colorant 112, such as C, Y, M and/or K ink or inks.

The medium 134 may be considered as a Neugebauer Primary of the printing system (the Neugebauer Primary that has zero ink drops). For example, the medium 134 may be chromatic substrate and the color of the substrate may be a Neugebauer Primary of the printing system.

In examples, all possible Neugebauer Primaries that can be achieved using an opaque ink 108 and the other process colorant/colorants 112 may be determined. In other examples, the Neugebauer Primaries that comprise the opaque ink 108 may be constrained to the Neugebauer Primaries that use the opaque ink 108 as the first or last ink drop or drops. As the opaque ink 108 is opaque, this reflects the two viewing arrangements supported by current indiscriminate under or over printing of opaque inks, such as white ink.

In some examples, more than one opaque ink 108 may be used. In such examples all possible Neugebauer Primaries that can be achieved using the opaque inks and the other process colorant/colorants 112 may be determined. In other examples using multiple opaque inks, the Neugebauer Primaries may be constrained to using a single opaque ink in a Neugebauer Primary. For example, some Neugebauer Primaries would use a first opaque ink and some Neugebauer Primaries would use a second opaque ink.

In examples using more than one opaque ink, the Neugebauer Primaries that comprise an opaque ink may be constrained to the Neugebauer Primaries that use an opaque ink as the first or last ink drop or drops.

The Neugebauer Primaries comprising the opaque ink/inks 108 may be constrained by selecting the desired Neugebauer Primaries from all possible Neugebauer Primaries, for example those having the opaque ink as the first or last drop or drops.

Accordingly, there are two categories of Neugebauer Primaries available to a printing system such as the apparatus 100 of FIG. 1. A first category that includes the opaque ink/inks, which may be constrained to first or last drop or drops, and a second category that does not involve the opaque ink/inks 108.

The Neugebauer Primaries can be freely combined using the HANS printing process allowing use of at least one opaque ink 108, such as white ink 124, as a process colorant 110.

At block 304, the Neugebauer Primaries colorimetries are determined. In examples, this may be done by printing and measuring all of the Neugebauer Primaries colorimetries. This may be enabled and/or controlled by the controller 102. Additionally/Alternatively, at least one model 116 may be used to predict the colorimetry of the Neugebauer Primaries. In some examples, the at least one model 116 may be stored in the memory 136 of the controller 102.

At block 306, the color gamut of the Neugebauer Primaries colorimetries is computed. In some examples, the ink limit of the chosen medium 134 may be taken into account when computing the color gamut of the Neugebauer Primaries colorimetries.

At block 308, a mapping from the Neugebauer Primaries colorimetries to Neugebauer Primary Area Coverage Statistics is built. This may be done using existing HANS methods, for example, by tessellating Neugebauer Primaries colorimetries, optimizing for ink use and so on.

At block 310, a look-up table is determined. The look-up table may specify, for the colors available in the printing system, a combination of the printing system's Neugebauer Primaries. Some of the Neugebauer Primaries will include an opaque ink/inks 108 and some of the Neugebauer Primaries will not include an opaque ink/inks 108. The look-up table may also include relative area coverages for the colors.

This approach allows for opaque ink/inks 108, such as white ink 124, to be processed as a process colorant 110 of a printing system. For example, if printing on a black substrate using this approach with C, M, Y, K and white inks this could result in using no ink at all for black pixels in a print job instead of printing white ink over the whole area of the image and then the addition of C, M, Y, K ink amounts, which is highly inefficient.

The overall gamut of a printing system with the above pipeline, thanks to HANS's inherent linearity, would effectively be the convex whole of the gamut of a pipeline, which may be on a colored substrate, without the use of an opaque ink 108, and that of the gamut of a fully under- or over-printed gamut.

This provides for, for example, gamut increases versus current white under/over-printing and also increased ink use efficiency by taking advantage of the color of a substrate instead of building up color content relative to a white colorant.

Although the examples above have been described with reference to a HANS printing process in some examples a HANS printing process may not be used.

For example, block 202 in FIG. 2 may recite processing information 104 as part of a printing process to use at least one opaque ink 108 as a process colorant 110 in combination with at least one further process colorant 112.

In some examples, the printing process may be a HANS printing process and in such examples block 202 in FIG. 2 may be described in greater detail with reference to FIG. 3 as in the preceding paragraphs.

In other examples, the printing process may not be a HANS printing process and in such examples block 202 in FIG. 2 may be described in greater detail with reference to FIG. 4 as in the following paragraphs.

FIG. 4 illustrates an example of a processing method 400.

In examples, the method 400 may be performed by the controller 102 of apparatus 100 illustrated in the example of FIG. 1.

At block 402 A color separation for a printing system, such as the apparatus 100 illustrated in the example of FIG. 1, is built. In the example of FIG. 4 a look up table mapping device colors, for example Red, Green, Blue (RGB) or Cyan, Magenta, Yellow, Black (CMYK), to ink-vectors is determined.

In block 402, the device color to ink-vector mapping is determined for the process colorant/colorants available to the printing system and excluding opaque ink 108. In examples, any number of process colorants may be used and any suitable process colorants may be used, for example CMYK.

At block 404, the colorimetries of the nodes of the first look up table are determined. In examples, this may be done by printing and measuring the nodes of the first look up table. This may be enabled and/or controlled by the controller 102. Additionally/Alternatively, at least one model 116 may be used to predict the colorimetry of the nodes of the first look up table. In some examples, the at least one model 116 may be stored in the memory 136 of the controller 102.

In some examples, the per node ink-use of the nodes of the first look up table may be calculated.

At block 406, a second look up table mapping device colors of the printing system to ink vectors, this time including an opaque ink 108, is determined. For example, the first look up table may be modified so that the nodes of the first look up table are under-printed with an opaque ink 108, for example white ink.

In examples, the first look up table may be modified so that the nodes of the first look up table are over-printed with an opaque ink.

In other examples, the first look up table may be modified so that an opaque ink is intermixed with the nodes of the first look up table.

In some examples, the first look up table may be modified so that the nodes of first look up table are under-printed and/or over-printed and/or intermixed with an opaque ink. For example, if under-printing and over-printing are used the result would be two further look up tables, one for under-printing and one for over-printing.

Additionally/Alternatively, in examples, the first look up table may be modified so that the nodes of the first look up table are under-printed with a first opaque ink and also with a second, different opaque ink. In such examples, the result would be two further look up tables, one for the first opaque ink and one for the second, different opaque ink.

In examples, any number of opaque inks may be used in combination with under-printing and/or over-printing and/or intermixing with the process colorants resulting in the corresponding number of look up tables.

For example, if two different opaque inks are used, one with over-printing and the other with both over-printing and under-printing the result would be three look up tables in addition to the first look up table.

In the example of FIG. 4, a single opaque ink and under-printing is used resulting in the second look up table.

At block 408, the colorimetries of the nodes of the second look up table are determined. In examples, this may be done by printing and measuring the nodes of the second look up table. This may be enabled and/or controlled by the controller 102. Additionally/Alternatively, at least one model 116 may be used to predict the colorimetry of the nodes of the second look up table. In some examples, the at least one model 116 may be stored in the memory 136 of the controller 102.

In some examples, the per node ink-use of the nodes of the second took up table may be calculated.

In some examples, the first and second look up tables have the same number of nodes/resolution but may have different ink-vectors and/or different colorimetries and/or different ink-uses per node.

At block 410, the calorimetric gamuts of the first and second look up tables are computed. The ink limit of the chosen medium 134 may be taken into account.

At block 412, the first and second look up tables are evaluated. In examples the nodes of the first and second look up tables may be parsed and evaluated as to whether at a selected node one of the look up tables exceeds the gamut of the other look up table. If so, the node that exceeds the gamut of the other look up table may be kept.

In some examples, if a node in both the first and second look up tables are in the intersection of the two gamuts then those nodes may be evaluated as to which of the nodes is more ink-efficient. In such examples, the more ink-efficient node may be kept.

At block 414 a third look up table is determined. The third look up table is a combination of the first and second look up table optimised as described in the preceding paragraphs. The third look up table addresses a larger gamut than the first or second look up tables.

In examples, the third look up table may include the opaque ink 108 in the ink-vectors of some nodes and may not include the opaque ink in the ink-vectors of other nodes, depending on which of the first and second look up tables nodes were optimal.

In examples where more than one look up table is determined in block 406, the additional look up tables may be included in blocks 408 to 414. For example, the colorimetries for all look up tables determined in block 406 may be determined in block 408 and their gamuts computed in block 410. The further look up tables may also be included in the evaluation in block 412 resulting in a final look up table in block 414 that is optimised across all available look up tables.

The blocks illustrated in the FIGS. 2, 3 and 4 may represent steps in a method and/or sections of code in the computer program 126. The illustration of a particular order to the blocks does not necessarily imply that there is a required or preferred order for the blocks and the order and arrangement of the block may be varied. Furthermore, it may be possible for some blocks to be omitted.

Although examples have been described in the preceding paragraphs, it should be appreciated that modifications to the examples given can be made without departing from the scope of the invention as claimed. For example, the opaque ink/inks may not include white ink and may be any opaque ink/inks.

Features described in the preceding description may be used in combinations other than the combinations explicitly described.

Although functions have been described with reference to certain features, those functions may be performable by other features whether described or not.

Although features have been described with reference to certain examples, those features may also be present in other examples whether described or not.

Whilst endeavoring in the foregoing specification to draw attention to those features believed to be of particular importance it should be understood that the Applicant claims protection in respect of any patentable feature or combination of features hereinbefore referred to and/or shown in the drawings whether or not particular emphasis has been placed thereon.

We claim:

1. A printing apparatus comprising:
    a printing device to form an image on media using a plurality of colorants, including a plurality of process colorants corresponding to colors of a color space, and an opaque ink that is a non-process colorant and that has an opacity greater than that of the process colorants; and
    a controller to:
        process information of the image according to a Halftone Area Neugebauer Separation printing process in which the opaque ink is used as another process colorant in combination with the process colorants, including determining Neugebauer Primary colorimetries using the opaque ink and the process colorants by printing and measuring the Neugebauer Primaries colorimetries or using a model to predict the colorimetries of the Neugebauer Primaries; and
        correspondingly control the printing device to form the image on the media as part of the printing process.

2. An apparatus as claimed in claim 1, wherein processing information comprises computing a color gamut of the Neugebauer Primaries colorimetries.

3. An apparatus as claimed in claim 1, wherein processing information comprises constraining Neugebauer Primaries that comprise an opaque ink to Neugebauer Primaries that use the opaque ink as first or last ink drop or drops relative to deposition of the process colorants.

4. An apparatus as claimed in claim 1, wherein the opaque ink is white ink.

5. An apparatus as claimed in claim 1, wherein the opaque ink is a first opaque ink, and the colorants further include a second opaque ink that is a non-process colorant and that has an opacity greater than that of the process colorants.

6. A method comprising:
processing, by a processor, data of an image according to a Halftone Area Neugebauer Separation printing process in which an opaque ink that is a non-process colorant is used as another process colorant in combination with a plurality of process colorants corresponding to colors of a color space, the opaque ink having an opacity greater than that of the process colorants, including:
determining Neugebauer Primary colorimetries using the opaque ink and the process colorants by printing and measuring the Neugebauer Primaries colorimetries or using a model to predict the colorimetries of the Neugebauer Primaries;
printing, using a printing device, the processed data to form the image on media.

7. A method as claimed in claim 6, wherein processing information comprises computing a color gamut of the Neugebauer Primaries colorimetries.

8. A method as claimed in claim 6, wherein processing information comprises constraining Neugebauer Primaries that comprise an opaque ink to Neugebauer Primaries that use the opaque ink as first or last ink drop or drops relative to deposition of the process colorants.

9. A method as claimed in claim 6, wherein the opaque ink is white ink.

10. An apparatus comprising:
a controller to:
process information of an image according to a printing process in which an opaque ink that is not a process colorant is used as another process colorant in combination with a plurality of process colorants corresponding to colors of a color space, including determining Neugebauer Primary colorimetries using the opaque ink and the process colorants by printing and measuring the Neugebauer Primaries colorimetries or using a model to predict the colorimetries of the Neugebauer Primaries; and
correspondingly control a printing device to form the image on the media using the process colorants and the opaque ink as part of the printing process.

11. An apparatus as claimed in claim 10, wherein processing information comprises determining a first look up table mapping device colors to ink-vectors for the at least one further process colorant and excluding the opaque ink and determining a second look up table mapping device colors to ink vectors for the process colorants and including the opaque ink.

12. An apparatus as claimed in claim 5, wherein the first opaque ink is used as first ink drops relative to deposition of the process colorants, and the second opaque ink is used as last ink drops relative to the deposition of the process colorants.

13. An apparatus as claimed in claim 1, wherein the colorant vectors comprise Neugebauer Primary area coverage vectors.

* * * * *

UNITED STATES PATENT AND TRADEMARK OFFICE
CERTIFICATE OF CORRECTION

PATENT NO. : 10,205,849 B2  
APPLICATION NO. : 15/306974  
DATED : February 12, 2019  
INVENTOR(S) : Jan Morovic et al.

Page 1 of 1

It is certified that error appears in the above-identified patent and that said Letters Patent is hereby corrected as shown below:

On the Title Page

In item (71), Applicants, in Column 1, Lines 1-10, delete "HEWLETT-PACKARD DEVELOPMENT COMPANY, LP., Houston, TX (US); Jan Morovic, Colchester (GB); Peter Morovic, Sant Cugat del Valles (ES); Juan Manuel Garcia Reyero Vinas, Sant Cugat del Valles (ES); Ronald Albert Askeland, San Diego, CA (US); Andreas Muller, Barcelona (ES); Michel Georges Encrenaz, Rubi (ES)" and insert -- HEWLETT-PACKARD DEVELOPMENT COMPANY, LP., Houston, TX (US) --, therefor.

Signed and Sealed this  
Twenty-first Day of May, 2019

Andrei Iancu  
*Director of the United States Patent and Trademark Office*